H. MUELLER, DEC'D.
O. B. & A. MUELLER, EXECUTORS.
SERVICE T AND COCK.
APPLICATION FILED JULY 28, 1910.
993,093.
Patented May 23, 1911.
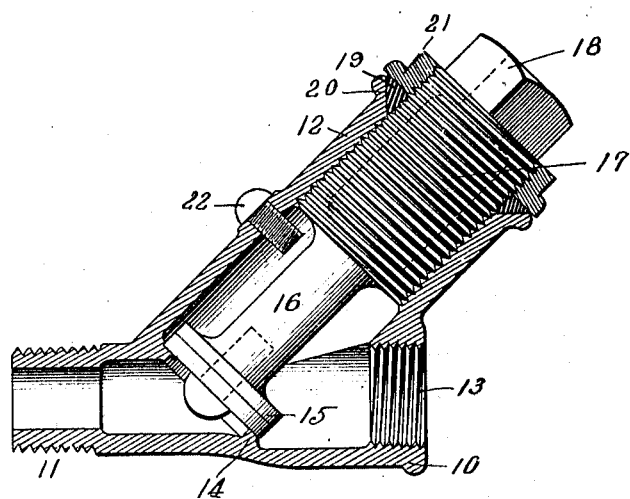
Witnesses
Inventor
Henry Mueller
By Meyers, Cushman & Rea
Attorney

UNITED STATES PATENT OFFICE.

HENRY MUELLER, OF DECATUR, ILLINOIS; ORA B. MUELLER AND ADOLPH MUELLER, EXECUTORS OF SAID HENRY MUELLER, DECEASED, ASSIGNORS TO H. MUELLER MANUFACTURING COMPANY, OF DECATUR, ILLINOIS, A CORPORATION OF ILLINOIS.

SERVICE T AND COCK.

993,093. Specification of Letters Patent. Patented May 23, 1911.

Application filed July 28, 1910. Serial No. 574,395.

*To all whom it may concern:*

Be it known that I, HENRY MUELLER, a citizen of the United States, residing at Decatur, in the county of Macon and State of Illinois, have invented new and useful Improvements in Service T's and Cocks, of which the following is a specification.

My invention relates to valves of the type commonly called cocks, and is especially directed to those of that type commonly known as service tees and cocks. These service tees and cocks are very much used in making connections to gas mains. While especially adapted for use in connection with this specific type of main, and for use in the specified situations, the valve of my invention is capable of use in connection with other types of mains and in other situations.

An important object of my invention is to provide in a three-branch casing having a plug seated in one of the chambers or branches, a novel arrangement of a packing which is adapted to exteriorly engage the lip of one branch of the casing, and means removably mounted on said plug which is designed to compress the packing against the exterior wall of the casing in which it is positioned.

Another feature which I provide consists of a removable stop; this stop is adapted to retard the operative movement of the valve plug when it is unseated. While I am aware that this feature is not new in a valve device, yet its position in a three-branch casing has not been commensurate with the facility that I attain in my device. I provide a form of plug which has a finely screw threaded protruding head, the casing in which it is positioned being correspondingly threaded to snugly embrace the head, and the casing carries a screw which projects interiorly thereof adjacent its screw threaded portion, and the plug head lies normally adjacent this screw.

The advantage of my arrangement will be obvious from the description hereinafter to follow.

I have aimed in my invention to produce an efficient and durable service tee and cock which is not expensive to manufacture.

In the accompanying drawings, I show one embodiment of my invention.

The single figure of the drawing is a central longitudinal section of the valve of my invention.

10 designates the casing generally. This casing is a three-branch casing, the several branches being designated 11, 12 and 13 respectively. The branches 11 and 13 are in line with each other, while the branch 12 makes an acute angle with the other two branches.

14 is the valve seat which separates branch 11 from the branches 12 and 13. This seat is at right angles to the branch 12, and therefore makes the same acute angle with the branches 11 and 13 as does the branch 12.

The valve disk 15 coöperates with this seat to shut off the branch 11 from the other two branches. This valve disk 15 is mounted on a stem 16 which extends without the casing through the branch 12. This stem is provided with a much enlarged portion 17 screw-threaded directly into the branch 12. In order to lighten the valve to save in the cost of its manufacture, this enlarged portion is cored out, as indicated in dotted lines, from its outside end. The relative sizes of the enlarged portion 17 and the valve disk 15 are such that the valve disk 15 may readily be removed with the stem by simply unscrewing the same from the branch 12. The outer end of the stem is formed as a nut 18 for operating the valve by a wrench.

Between the outer end of the branch 12 of the casing and the screw-threaded enlarged portion of the stem is located a packing 19 in a conical packing recess 20, formed by reaming out the outer end of the branch 12. A gland 21 screw-threaded on the enlarged screw-threaded portion of the stem serves to clamp this packing 19 in place and upon the stem so as to make a tight joint. The outer end of this gland may be formed as a nut for convenience in adjustment in the same manner as the outer end of the stem is formed.

In order to limit the movement of the valve disk from its seat a screw 22 is threaded into the casing, the length of the screw being such that its inner end may project within the casing and between the valve disk and the enlarged portion of the stem. Preferably the head of the screw makes a fluid tight joint with the casing as shown, the length of the screw being such as to permit this without interference.

It should now be evident that this embodiment of my invention is at once simple, efficient, durable and cheap to manufacture. It is simple because it is made up of few parts easy of manipulation. It is durable because the parts can be made of the desired materials to secure the greatest durability and because its design allows the best proportioning of the parts. It is efficient because of the fact that a fluid tight fitting of the valve is most readily secured, because the fine screw-threads on the enlarged portion make it possible by the application of a wrench to secure as great a pressure as desired upon the valve seat by the disk, and because when the valve is open there is no leakage between the stem and the branch through which the stem passes, for after the valve is open the gland 21 may be tightly screwed home to force the packing into place around the stem to make a fluid tight joint. The removable stop 22 prevents the entire removal of the stem from the casing through accident or carelessness when opening the valve. This is a very important feature, for after connections have been made to the gas mains, and the system from the service tee has been completed, it is desired that the cock be opened and remain open. If it is open too far, leakage may result due to engagement of too few screw threads with the branch of the casing, or it may be that a careless workman will remove it altogether, and allow a considerable quantity of gas to escape before he replaces the same. The stop accurately positions the valve when it is opened. The stop, of course, does not interfere with the assembly and disassembly of the valve for the same may be readily removed.

I desire to cover in the annexed claims my invention as embodied in all types of valves in which it may be embodied without departing from its generic spirit, and in all situations in which it may be used.

What I claim is:

1. In a valve, a three branch casing, a valve seat which divides one branch from the other two, a valve disk and stem coöperating with said seat, said stem projecting from said casing through one of said other two branches, and having a much enlarged portion screw-threaded directly into said branch, a packing surrounding said screw threaded portion and exteriorly abutting against the mouth of said casing, and means removably carried by said screw threaded portion adapted to compress said packing against said mouth.

2. In a valve, a three-branched casing, a valve seat which divides one branch from the other two, a valve disk and stem co-operating with said seat, said stem projecting from said casing through one of said other two branches, and having a much enlarged head screw-threaded directly into said branch, said last named branch having a flared mouth forming an exterior lip and an interior cone-shaped recess adjacent said screw threaded head, a packing seated in said recess and surrounding said head, and means movably mounted on said head adapted to compress said packing within said recess, the movement thereof being limited by the casing lip, substantially as described.

3. In a valve having a three-branched casing and a valve seat which divides one branch from the other two, the combination of a valve disk and stem coöperating with said seat, said stem projecting from said casing through one of said other two branches and having a much enlarged head screw-threaded into said branch, a packing surrounding said screw threaded head and exteriorly abutting against said casing and a gland screw threaded to said head adapted to compress said packing against the mouth of said casing.

4. In a valve a three-branch casing, a valve seat which divides one branch from the other two, a valve disk and stem coöperating with said seat, said stem projecting from said casing through one of said other two branches and having a much enlarged portion screw-threaded directly into the said branch, a removable stop projecting from the casing and between the valve disk and the enlarged portion of the stem, a packing surrounding said screw threaded head and exteriorly abutting against said casing and a gland screw threaded to said head adapted to compress said packing against the mouth of said casing.

5. A service tee comprising two branches in line with each other and one at an acute angle with the other two, a valve seat between the first two mentioned branches, a valve stem in the other branch, a disk on the stem coöperating with the seat, said stem having an enlarged cored out head screw-threaded directly into the end of the branch, a stop projecting from the casing and between the valve disk and the enlarged portion of the stem, said last named branch having a flared mouth forming an exterior lip and an interior cone-shaped recess adjacent said screw threaded head, a packing seated in said recess and surrounding said head, and means movably mounted on said head adapted to compress said packing within said recess, the movement thereof being limited by the casing lip.

6. A valve device comprising a three-chambered casing, two of said chambers substantially in alinement, a plug positioned in the third chamber adapted to close communication between the others, said plug comprising a stem, a seating disk at one end of said stem and an integral enlarged screw threaded head at the other, said third chamber being correspondingly screw threaded to embrace said plug, the mouth of said chamber formed adjacent said head with an inclined wall, beyond which said head protrudes when the said disk is seated, a packing embracing said screw threaded head and abutting against the said inclined wall, and means removably carried by the protruding end of said head adapted to compress said packing against the inclined wall aforementioned.

7. A valve device comprising a three chambered casing, two of said chambers substantially in alinement, a plug positioned in the third chamber and adapted to close communication between the others, said plug comprising a stem, a seating disk at one end of said stem, and an enlarged screw threaded head at the other, said third chamber being correspondingly screw threaded to embrace said plug head, and having an adjustable interior stop adjacent its threaded portion, the mouth of said chamber formed adjacent said head with an inclined wall, beyond which said head protrudes when the said disk is seated, a packing embracing said screw threaded head and abutting against the said inclined wall, a removable gland screwed to the protruding end of said plug adapted to compress said packing against the said inclined wall, said inclined wall retarding the movement of said gland, as and for the purpose set forth.

In testimony whereof I have hereunto set my hand in presence of two subscribing witnesses.

HENRY MUELLER.

Witnesses:
 W. R. GUSTIN,
 WILLIAM R. BIDDLE.